US010082372B1

(12) United States Patent
Iliev

(10) Patent No.: US 10,082,372 B1
(45) Date of Patent: *Sep. 25, 2018

(54) MATERIAL FOR AND THE METHOD OF MANUFACTURE FOR BALLISTIC SHIELDING

(71) Applicant: Vall Iliev, Stow, OH (US)

(72) Inventor: Vall Iliev, Stow, OH (US)

(73) Assignee: SHOTSTOP BALLISTICS LLC, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/335,216

(22) Filed: Oct. 26, 2016

Related U.S. Application Data

(63) Continuation-in-part of application No. 14/701,326, filed on Apr. 30, 2015, now Pat. No. 9,944,041, and a continuation-in-part of application No. 13/219,920, filed on Aug. 29, 2011, now Pat. No. 9,180,623.

(51) Int. Cl.
| | | |
|---|---|---|
| *B23K 37/00* | (2006.01) | |
| *F41J 11/02* | (2009.01) | |
| *F41H 5/04* | (2006.01) | |
| *B32B 5/12* | (2006.01) | |
| *B32B 5/26* | (2006.01) | |
| *B32B 27/12* | (2006.01) | |

(52) U.S. Cl.
CPC ............... *F41J 11/02* (2013.01); *B32B 5/12* (2013.01); *B32B 5/26* (2013.01); *B32B 27/12* (2013.01); *F41H 5/0471* (2013.01); *B32B 2307/10* (2013.01); *B32B 2307/54* (2013.01); *B32B 2307/558* (2013.01); *B32B 2571/02* (2013.01)

(58) Field of Classification Search
CPC ........................................................ F41J 11/00
USPC ............................................................ 428/105
See application file for complete search history.

(56) References Cited

U.S. PATENT DOCUMENTS

| | | | |
|---|---|---|---|
| 4,403,012 A | 9/1983 | Harpell et al. | |
| 4,457,985 A | 7/1984 | Harpell et al. | |
| 4,566,237 A | 1/1986 | Turner | |
| 4,613,535 A | 9/1986 | Harpell et al. | |
| 4,623,574 A | 11/1986 | Harpell et al. | |
| 4,650,710 A | 3/1987 | Harpell et al. | |
| 4,737,402 A | 4/1988 | Harpell et al. | |

(Continued)

FOREIGN PATENT DOCUMENTS

WO    WO2015138025 A1    9/2015

*Primary Examiner* — Brent T O'Hern
(74) *Attorney, Agent, or Firm* — John D. Gugliotta

(57) ABSTRACT

A ballistic resistant curtain system is provided formed of a plurality of aligned ballistic material panels. Panels protect vertical surfaces, and can be reconfigured for horizontal surfaces or other oriented areas. Adjacent panels may be are aligned end to end in a butt or overlap manner, or configured to be angularly disposed toward the direction of fire such as to form a line of sight overlap. Each panel is formed of high strength fibers made from materials such as extended chain ultra-high molecular weight polyethylene. An exterior coating formed of fabric, polyurethane, or other material provides both an acoustic attenuation or sound absorbing surface as well as an aesthetic facing for providing an improved visual appearance to the area. The instant abstract is neither intended to define the invention disclosed in this specification nor intended to limit the scope of the invention in any way.

16 Claims, 4 Drawing Sheets

(56) References Cited

U.S. PATENT DOCUMENTS

| | | |
|---|---|---|
| 4,748,064 A | 5/1988 | Harpell et al. |
| 5,257,583 A | 11/1993 | Koenig |
| 5,552,208 A | 9/1996 | Lin et al. |
| 5,587,230 A | 12/1996 | Lin et al. |
| 5,683,781 A | 11/1997 | Komarek et al. |
| 5,907,930 A | 6/1999 | Ricco, Sr. |
| 6,007,469 A | 12/1999 | Jaegers et al. |
| 6,642,159 B1 | 11/2003 | Bhatnagar et al. |
| 6,841,492 B2 | 1/2005 | Bhatnagar et al. |
| 6,846,758 B2 | 1/2005 | Bhatnagar et al. |
| 7,415,806 B2 | 8/2008 | Davidson |
| 7,661,228 B1 | 2/2010 | Nolte et al. |
| 7,762,175 B1 | 7/2010 | Bhatnagar et al. |
| 7,784,232 B2 | 8/2010 | Nygren et al. |
| 7,921,758 B2 | 4/2011 | Eden et al. |
| 7,964,267 B1 * | 6/2011 | Lyons .................. B29C 33/68 139/383 R |
| 8,544,240 B2 | 10/2013 | Hughes, Jr. |
| 9,115,960 B2 | 8/2015 | Kim |
| 2003/0159400 A1 | 8/2003 | Forrester |
| 2005/0086905 A1 | 4/2005 | Ralph et al. |
| 2006/0248827 A1 | 11/2006 | Meeker |
| 2007/0224401 A1 | 9/2007 | Telander |

\* cited by examiner

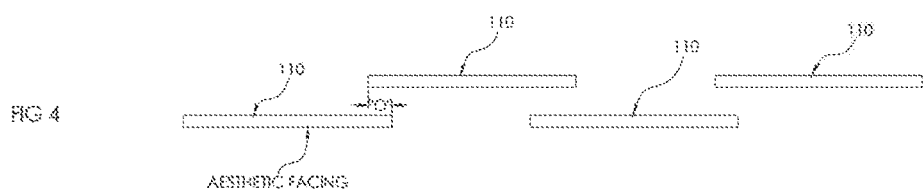
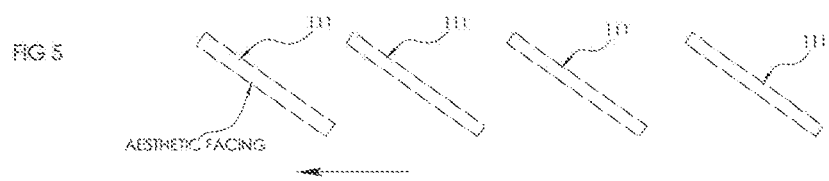
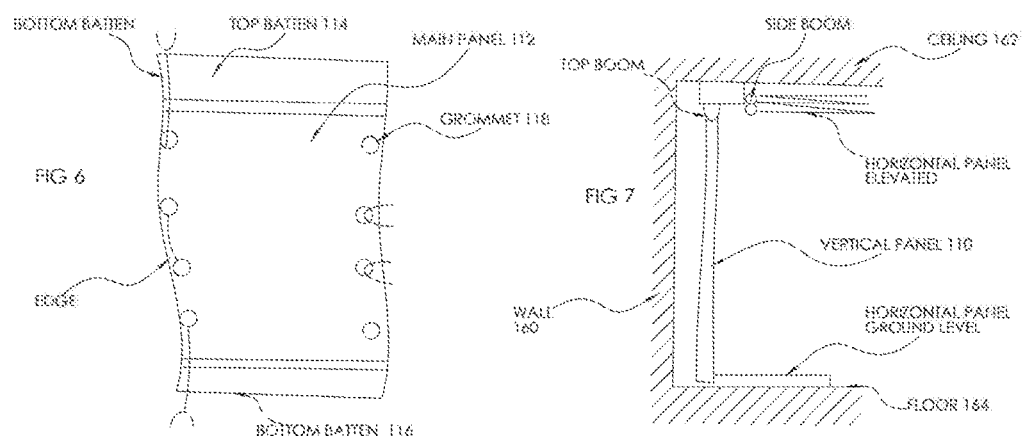

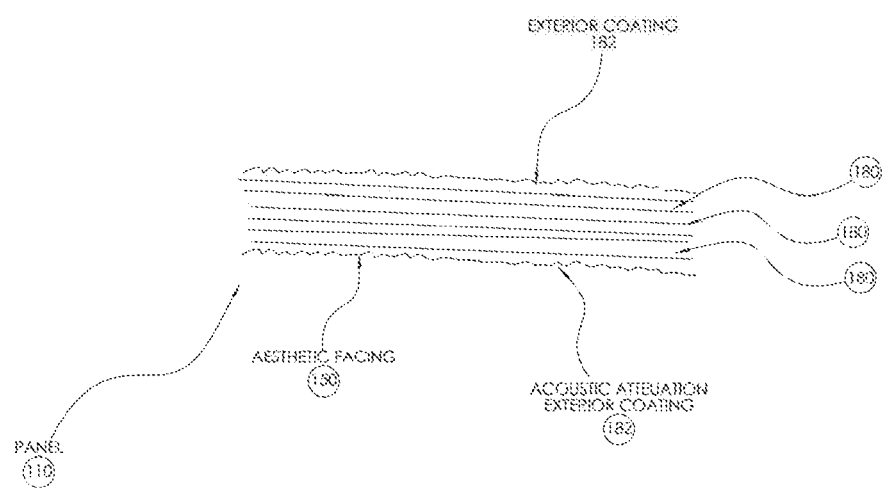

MATERIAL FOR AND THE METHOD OF MANUFACTURE FOR BALLISTIC SHIELDING

RELATED APPLICATIONS

The present invention is a Continuation in Part application of U.S. Ser. No. 14/701,326, filed on Apr. 30, 2015 and which was a continuation in part of U.S. Ser. No. 13/219,920, filed on Aug. 29, 2011 and now U.S. Pat. No. 9,180,623, both of which are incorporated by reference as if fully rewritten herein.

BACKGROUND OF THE INVENTION

1. Field of the Invention

This invention relates generally to equipment utilized in the operation of indoor shooting ranges and, more particularly, to a ballistic resistant curtain system formed of an improved composite ballistic material.

2. Description of the Related Art

Indoor shooting ranges typically have similar layouts to incorporate standard safety devices and systems, and slightly different from outdoor shooting ranges. Because of the enclosed space, indoor shooting ranges need to be concerned with lane divider safety, ricochet mitigation, and acoustic protection.

A typical indoor shooting range layout is depicted in FIG. 1 according to the Prior Art. As depicted, a typical range layout includes one or more shooting cages 10 from which a shooter is positioned. Such cages 10 include lane dividers or separation baffles 12 to organize the firing line into defined shooting positions and furnish protection from adjacent shooters by minimizing side-blast interference and the hazard of misdirected shots. They also provide a location for mounting individual shooter controls for target systems and complementary range systems. The cages 10 and separation baffles 12 are of bullet resistant materials, and are separated from a target system 14 by a shooting lane 16. At the distal end of the lane 16 past the target system 14 is a bullet trap 20. A target retrieval system 22 allots positioning and return of the target 14.

Primary safety systems incorporated throughout the walls, floor, ceiling and ricochet screen include ballistic protection. Such ballistic protection provides primary impact protection from fired rounds, as well as secondary impact protection to prevent hazardous stray or ricochet projectiles. This generally includes steel plates cladding the exposed surfaces and positioned throughout the range as baffle structures 30. The positioning, orientation, dimension and positioning of such metal baffles 30 are intended to provide protection against errant and/or ricochet projectiles.

While the use of metal baffles and cladding provide effective ballistic protection, they are heavy, unattractive, provide no or negative acoustic protection, and are difficult to install, replace or repair. Further, the use of metal baffles and cladding can facilitate a lead hazard associated with the continuous destruction of lead projectiles.

Various improvements are known that are useful for use with indoor shooting ranges. For example, U.S. Pat. No. 5,564,712, issued in the name of Werner, discloses a bullet trap for indoor shooting with small arms. The bullet trap is used behind targets, and includes a vertically suspended curtain made of rubber, and a vertically supported impact plate made of steel and being spaced behind the curtain. The space between the curtain and the impact plate is enclosed by cover plates extending forwards from the side, upper and lower margins of the impact plate. With the space between the impact plate and the curtain contained, the enclosed space is continuously evacuated by a fan and interconnected filter to prevent lead containing dust, which is set free upon the impact of the bullets in the bullet trap, from being distributed to the air and the shooting premises.

U.S. Pat. No. 6,526,861, issued in the name of Gruber, discloses a projectile stopping device for the purpose of damping the noise propagation linked to the striking of projectiles. Further, the braking of the projectiles, and their easier recovery, is facilitated by individual stopping curtains which are spaced apart from each other in the firing direction and suspended by steel cables. The stopping cables are received in receiving devices which are identically formed at the top and bottom, and are thereby connected to guides which are also formed in an identical manner to each other. The attachment of the stopping cables to these guides and their arrangement within a curtain are arranged in such a way that each stopping cable, when deflected, is always subject to a return force bringing it back into its original position. The projectiles striking the stopping curtains formed in this way within a firing field effect deflections of the steel cables both in the planes of the individual stopping curtains and also perpendicular thereto and can, after successful braking, be caught on the floor and sent for proper disposal.

U.S. Pat. No. 5,405,673, issued in the name of Seibert, discloses a shooting range backstop for firearm projectiles that includes a body of an ionomeric polymer disposed so as to slow and stop projectiles. The body of ionomeric material may comprise a plurality of spaced-apart sheets.

And, U.S. Pat. No. 3,815,520, issued in the name of Nikoden, discloses a shooting range ceiling protection device for a shooting range which includes a plurality of rectangular ceiling modules locked together at the sides and being suspended at the top and bottom edges. Each one of the modules has two positions for being hooked by a suspension chain. Normally only one chain is coupled to one of the hooks, leaving the other hook unused. When it is desired to remove and replace one of the modules due to excessive damage, the chain is merely unhooked from its normal position and connected to an adjacent hook means of another module. Once this is accomplished the module which is being replaced is free to be readily disconnected from the remaining ceiling structure. When the module is replaced, the chain is merely restored to its original position in the new module.

While many of these references may incorporated, reference or describe ballistic resistant elements which may be used in conjunction with or incorporated into this invention in combination, other elements are different enough as to make the combination distinguished over any of the prior art. Consequently, a need exists has been felt for providing improved ballistic resistant materials that mitigate the aforementioned drawbacks.

SUMMARY OF THE INVENTION

It is therefore an object of the present invention to provide improved equipment for use in the operation of indoor shooting ranges.

It is a feature of the present invention to provide a ballistic resistant curtain system formed of an improved composite ballistic material.

Briefly described according to the preferred embodiment of the present invention, a ballistic resistant curtain system is provided formed of a plurality of aligned ballistic material panels. Each ballistic material panel is formed of an improved composite ballistic material. Panels can be used to protect vertical surfaces, and can be reconfigured to provide coverages for horizontal or other oriented areas. Adjacent panels may be are aligned end to end in a butt or overlap manner, or configured to be angularly disposed toward the direction of fire such as to form a line of sight overlap. Each panel may be formed of composite materials which include high strength fibers made from materials such as extended chain ultra-high molecular weight polyethylene. These composites display varying degrees of resistance to penetration by high speed impact from projectiles such as bullets, shells, shrapnel and the like. An exterior coating formed of fabric, polyurethane, or other material provides both an acoustic attenuation or sound absorbing surface as well as an aesthetic facing for providing an improved visual appearance to the area.

It is an advantage of the present invention to provide ballistic protection curtains that provide primary impact protection from fired rounds.

It is another advantage of the present invention to provide ballistic protection curtains that provide secondary impact protection to prevent hazardous stray or ricochet projectiles.

It is yet another advantage of the present invention to provide a replacement for steel plates, baffles or cladding in the protection of exposed surfaces throughout an indoor shooting range.

It is still yet another advantage of the present invention to provide acoustic attenuation within an indoor shooting range.

It is yet still other advantages of the present invention to provide a device and system that lighter than conventional solutions, can be made to include various colors or aesthetics, and are difficult to install, replace or repair.

Further, it is an advantage of the present invention to facilitate the mitigation of a lead hazard associated with the continuous destruction of lead projectiles.

These and other objects of the invention will become apparent to one of ordinary skill in the art after reading the disclosure of the invention.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4 is a top plan view of a curtain orientation layout according to a first configuration for use with the preferred embodiment of the present invention;

FIG. 5 is a top plan view of a curtain orientation layout according to a second configuration for use with the preferred embodiment of the present invention;

FIG. 6 is a front elevational view of a ballistic resistant curtain panel for use with a system of the preferred embodiment of the present invention;

FIG. 7 is a side elevational view of a typical installation of a ballistic resistant curtain panel for use with a system of the preferred embodiment of the present invention; and FIG. 8 is a cross sectional view of a ballistic resistant curtain panel for use with a system of the preferred embodiment of the present invention.

DESCRIPTION OF THE PREFERRED EMBODIMENTS

The best mode for carrying out the invention is presented in terms of its preferred embodiment, herein depicted within the Figures.

1. Detailed Description of the Figures

Figure 2:
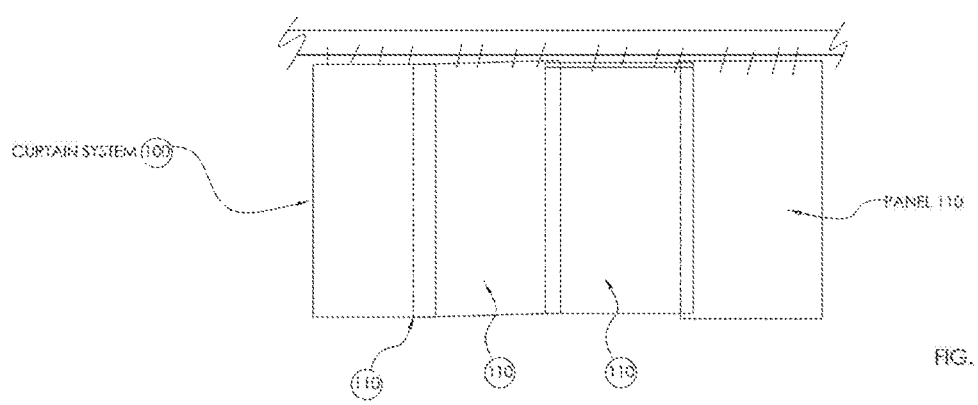
FIG. 2 is a front elevational view of a ballistic resistant curtain system formed of improved composite ballistic material panels according to a first preferred embodiment of the present invention.
Figure 3:
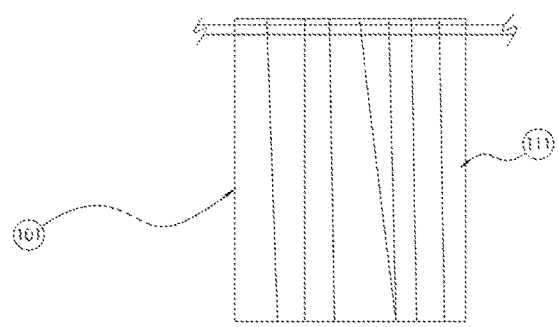
FIG. 3 is a front elevational view of a ballistic resistant curtain system formed of improved composite ballistic material panels according to a second preferred embodiment of the present invention.

Referring now to the Figures, a ballistic resistant curtain system is provided, generally noted as 100, according to a preferred embodiment of the present invention. The curtain system 100 is formed of a plurality of individual ballistic material panels 110 that are aligned such as to provide a surface having a generally contiguous line of sight covering for nonballistic surfaces. Each ballistic material panel 110 is formed of an improved composite ballistic material. The panels 110 may be of a variety of configurations, such as the larger panels 110 positioned abutted to or slightly overlaped with adjacent panels, as shown best in FIG. 2. One potential alternate configuration may include a vertical blind type of arrangement 101 formed of much narrower panels strips 111 as best shown in FIG. 3. No matter what selected configuration is used, it is preferred that each panel 110/111 be formed of the ballistic materials described, taught, disclosed or anticipated within the Related Art listed above as and described in greater detail below.

As shown in reference to FIG. 4, each panel 110 may be overlapped with adjacent panels via an offset "O". Such a configuration is envisioned as useful when aligning the panels 110 flat and parallel with a protected surface. As further shown in conjunction with FIG. 4, an alternate arrangement of alignment may be used in which the outer facing 150 of each panel element 111 is angularly directed toward the direction of fire "D". When configured to be angularly disposed toward the direction of fire, it is preferred that the panel elements 111 be arranged such as to form a line of sight overlap.

Referring now in conjunction with FIG. 6 a typical layout for a panel 110 is shown in greater detail. Each panel 110 is to have a main panel surface 112 formed of a planar material to absorb and retain ballistic projectiles. Various configurations of attachment details may be further included, such as a top batten 114 and bottom batten 116 for providing installation surfaces for the top and bottom of the panel 110, respectively. Optionally, grommets 118 or functionally similar attachment point may be used to affixed each panel 110 to its adjacent panel, or to provide a securement surface for attachment to an achoring element 120.

As further shown in conjunction with FIG. 7, the system 100 may be used preferably to protect vertical surfaces 160, such as shooting range walls, and can be reconfigured to provide coverages for horizontal (e.g. ceiling 162, floor 164) or other oriented areas.

Finally, as shown best in conjunction with FIG. 8, each panel 110 may be formed of composite materials which include biased aligned lamina 180 of high strength fibers made from materials such as extended chain ultra-high molecular weight polyethylene. These composites display varying degrees of resistance to penetration by high speed impact from projectiles such as bullets, shells, shrapnel and the like. Ballistic resistant articles containing high [tensile] strength fibers may be used that have excellent properties against projectiles. High strength fibers conventionally used include polyolefin fibers, such as extended chain polyethylene fibers; and aramid fibers, such as para- and meta-aramid fibers may be used in a woven or knitted fabric. For other applications, the fibers may be encapsulated or embedded in a matrix material to form non-woven, rigid or flexible fabrics.

While such materials may be effective in conjunction with the system described herein, the current commercial price associated with such use may be prohibitive. As a result, it is a preferred aspect of the present invention that an otherwise amorphous plastic such as high density polyethylene ("HDPE") be used having an unaligned, non-crystalline molecular structure that is modified such as to result in a planar sheet material having a targeted molecular alignment. These modified HDPE planar sheets are described in greater detail in the RELATED ART, which is incorporated by reference as if fully rewritten herein. By way of example, and not as a limitation, such HDPE may be chemically or mechanically modified such that the alignment of the fibers creates an anisotropic material that can be further utilized as molecularly oriented thin planar sheets 180 to replace or supplement the use of fibers in the manufacture of ballistic shielding. Among other advantages, the use of theses molecularly oriented planar sheets of material provide a tremendous economic advantage over otherwise existing ballistic materials and their methods of manufacture. The present materials and their use, as well as their methods of manufacture, allows the composite to achieve ballistic resistance at a much lower cost-to-strength ratio than with traditional ballistic composites typically found on the market.

Finally, it is intended that each panel 110 may further include an exterior coating 182. Applied or attached over the outer surface of the panel, the coating 182 may be formed of fabric, rubber, polyurethane, or other material that may provide both an acoustic attenuation or sound absorbing surface, as well as an aesthetic facing 150 for providing an improved visual appearance to the area.

2. Operation of the Preferred Embodiment

Figure 1:
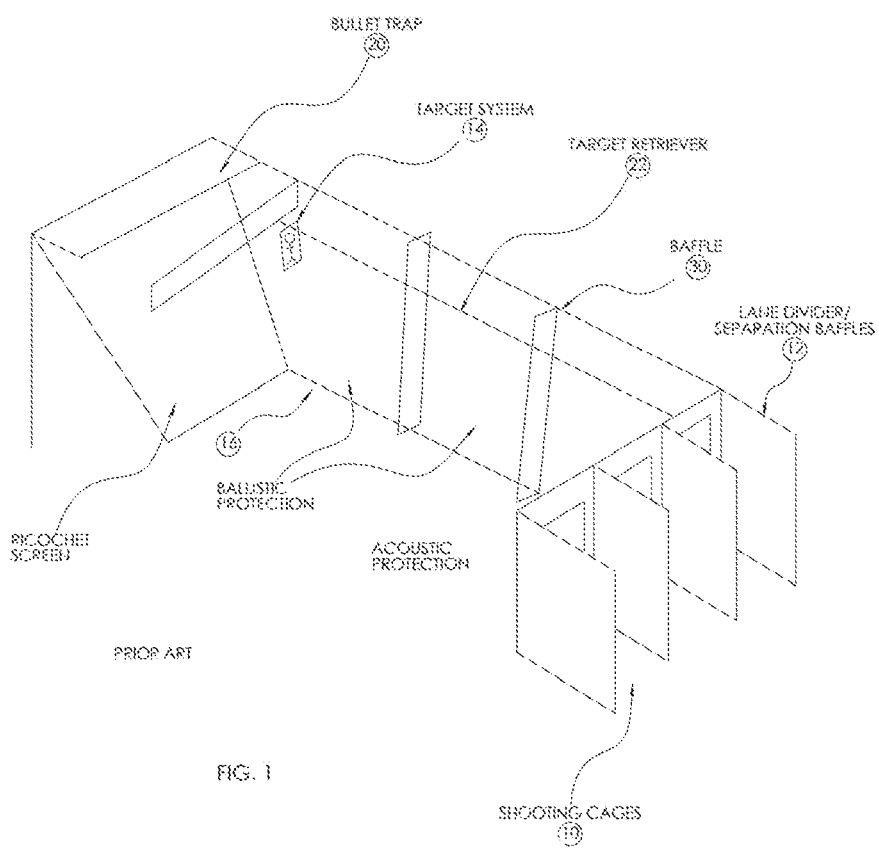
FIG. 1 is a perspective schematic view of a typical indoor shooting range layout according to the PRIOR ART.

In operation, the present system 100 is used to configure a typical indoor shooting range layout, such as depicted in FIG. 1, but in an improved manner. Walls, ceilings, floors, lane dividers, separation baffles or the like may be covered with ballistic resistant curtain panels, in lieu of steel plates, to provide protection from the hazards of misdirected shots or ricocheted projectiles. The panels 110 further provide an improved aesthetic, provide additional sound attenuation, and further better "capture" or retain bullets or bullet fragments when struck to mitigate the dispersion of lead into the shooting range atmosphere.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A ballistic resistant curtain system comprising:
a plurality of aligned ballistic material panels formed of a composite anti-ballistic material comprising:
interlineated layers of modified polyethylene materials; and
layers of carbon nanotubes between adjacent modified polyethylene material layers;
wherein each said interlineated layer of modified polyethylene material is formed having a molecularly oriented layer of material;
wherein each ballistic material panel is used to protect surfaces within an indoor shooting range.

2. The ballistic resistant curtain system of claim 1, wherein adjacent panels are aligned or configured such as to form a line of sight overlap.

3. The ballistic resistant curtain system of claim 1, wherein each said panel further comprises an exterior coating capable of functioning as an acoustic attenuator or sound absorber.

4. The ballistic resistant curtain system of claim 3, wherein each said panel further comprises an aesthetic facing for providing an improved visual appearance.

5. The ballistic resistant curtain system of claim 4, wherein said aesthetic facing is further self sealing when penetrated by a projectile.

6. The ballistic resistant curtain system of claim 2, wherein each said panel further comprises an exterior coating capable of functioning as an acoustic attenuator or sound absorber.

7. The ballistic resistant curtain system of claim 6, wherein each said panel further comprises an aesthetic facing for providing an improved visual appearance.

8. A ballistic resistant curtain system comprising:
a plurality of aligned ballistic material panels formed of a composite anti-ballistic material comprising:
interlineated layers of modified polyethylene materials; and
layers of carbon nanotubes between adjacent modified polyethylene material layers;
wherein each said interlineated layer of modified polyethylene material is formed having a molecularly oriented layer of material; and
wherein said least one layer of said molecularly oriented layers of material is processed by providing mechanical tension during alternate cycling of heating and cooling of such polyethylene material;
wherein each ballistic material panel is used to protect surfaces within an indoor shooting range.

9. The ballistic resistant curtain system of claim 8, wherein said alternate cycling of heating and cooling comprises a heating cycle including a heating of said material to a point above the midpoint between a melting point and a freezing point.

10. The ballistic resistant curtain system of claim 9, wherein said heating cycle comprises raising said material to approximately about 192 F.

11. The ballistic resistant curtain system of claim 9, wherein said alternate cycling of heating and cooling comprises a cooling cycle including lowering the material to approximately about 32 F.

12. The ballistic resistant curtain system of claim 8, wherein said layers of carbon nanotubes are at least approximately 1 mm in average thickness.

13. The ballistic resistant curtain system of claim 8, wherein adjacent panels are aligned or configured such as to form a line of sight overlap.

14. The ballistic resistant curtain system of claim 8, further comprising an exterior coating capable of functioning as an acoustic attenuator or sound absorber.

15. The ballistic resistant curtain system of claim 14, wherein each said panel further comprises an aesthetic facing for providing an improved visual appearance.

16. The ballistic resistant curtain system of claim 15, wherein said aesthetic facing is further self sealing when penetrated by a projectile.

\* \* \* \* \*